(12) United States Patent
Yan et al.

(10) Patent No.: US 8,390,142 B2
(45) Date of Patent: Mar. 5, 2013

(54) VERTICAL AXIS WIND TURBINE

(75) Inventors: Qiang Yan, Shanghai (CN); Yihui Shen, Shanghai (CN); Dong Zhang, Shanghai (CN); Chaoqi Jiang, Shanghai (CN); Haifeng Niu, Shanghai (CN)

(73) Assignee: Qiang Yan, Shanghai (CN)

( * ) Notice: Subject to any disclaimer, the term of this patent is extended or adjusted under 35 U.S.C. 154(b) by 0 days.

(21) Appl. No.: 13/164,750

(22) Filed: Jun. 20, 2011

(65) Prior Publication Data

US 2011/0248510 A1    Oct. 13, 2011

Related U.S. Application Data

(63) Continuation of application No. PCT/CN2009/001439, filed on Dec. 14, 2009.

(30) Foreign Application Priority Data

Dec. 19, 2008  (CN) .......................... 2008 1 0190618

(51) Int. Cl.
*F03D 9/00*   (2006.01)
*H02P 9/04*   (2006.01)

(52) U.S. Cl. ........................................................ 290/55
(58) Field of Classification Search .................... 290/55, 290/44
See application file for complete search history.

(56) References Cited

U.S. PATENT DOCUMENTS

| | | | | |
|---|---|---|---|---|
| 4,625,256 A * | 11/1986 | Scuka et al. | ................... | 361/117 |
| 7,510,366 B2 * | 3/2009 | Okubo et al. | ................... | 415/4.4 |
| 8,196,359 B1 * | 6/2012 | Jiang et al. | ................... | 52/173.1 |
| 2006/0120872 A1 | 6/2006 | Okubo et al. | | |

FOREIGN PATENT DOCUMENTS

| | | |
|---|---|---|
| CN | 1837604 A | 9/2006 |
| CN | 101302997 A | 11/2008 |
| CN | 201144766 Y | 11/2008 |
| CN | 201159138 Y | 12/2008 |
| CN | 101435412 A | 5/2009 |
| DE | 29900664 U1 | 6/1999 |
| DE | 299 00 664 U1 | 7/1999 |
| FR | 2291378 A1 | 6/1976 |

OTHER PUBLICATIONS

Machine translation of CN 2011 591 38. Jul. 19, 2012.*
Machine translation of CN 1013 029 97. Jul. 19, 2012.*
Machine translation of DE 299 00 664. Jul. 19, 2012.*
Machine translation of CN 1014 354 12. Jul. 19, 2012.*

* cited by examiner

*Primary Examiner* — Javaid Nasri
(74) *Attorney, Agent, or Firm* — Manni Li; Mei & Mark LLP

(57) ABSTRACT

A vertical axis wind turbine including: a vertical axis wind mill having a vertical shaft and a generator having a generator rotor shaft, wherein the vertical shaft of the wind mill share the same shaft with the generator rotor shaft. This arrangement simplifies the structure and increases the stability, reliability, and service lifetime of vertical axis wind turbines by making on-site assembly easy and cutting the on-site workload and cost, without undermining the wind resistance capability and safety prompting wider application of vertical axis wind turbines.

15 Claims, 10 Drawing Sheets

VERTICAL AXIS WIND TURBINE

CROSS-REFERENCE TO RELATED APPLICATIONS

This application is a continuation of International Patent Application No. PCT/CN2009/001439, with an international filing date of Dec. 14, 2009, designating the United States, now pending, and further claims priority benefits to Chinese Patent Application No. 200810190618.3, filed Dec. 19, 2008. The contents of all of the aforementioned applications, including any intervening amendments thereto, are incorporated herein by reference.

BACKGROUND OF THE INVENTION

1. Field of the Invention

The invention relates to the structure of a vertical axis wind turbine.

2. Description of the Related Art

As shown in FIG. 1, currently known a vertical axis wind turbine comprising a vertical axis wind mill 1 (the "wind mill") and a generator 2 etc. The wind mill 1 consists of a plurality of blades 13 that attached to supporting arms 12, which are connected with vertical shaft 11. The generator 2 and the wind mill 1 are usually connected in either of the following methods:

One method, as shown in FIG. 2, is using a flange and bolts to connect the vertical shaft 11 to the top of the generator's rotor shaft 21. In such a structure, since the alternating load on the wind mill is assumed by the connecting parts of the vertical shaft 11 and the rotor shaft 12, the connecting part must be very strong. After certain period of operation, the wind mill may fall from the generator. Worse still, limited by the on-site assembly condition, the assembly precision is low, coupled by the fact that wind turbines are usually used in bad weather, the wind mill is prone to resonate under high wind conditions and resulting in damage thereto.

The other method, as shown in FIG. 3, is using a sleeve connection. The vertical shaft 11 is situated on a pedestal 6 under the base of the generator. In such structure, the load on the wind mill does not exert on the rotor shaft 21, and the rotor shaft 21 is exempted from axial and radial load. The vertical shaft 11 bears the wind mill's weight and the alternating load, conveying torque by a sleeve 3 around the rotor shaft 11 and a coupling 5. A bearing 43 and a bearing 44 (deep groove ball bearing, angular contact bearing, or roller bearing) are needed between the vertical shaft 11 and the sleeve 3 for supporting purpose. Therefore, vertical axis wind turbines adopting such structure are heavy in weight and complicated in structure, and breakdowns are common after long operation; furthermore, a pedestal is required, increasing both weight and cost. In on-site assembly of wind turbines of such structure, the generator is firstly fixed on the pedestal 6, with attention paid to maintain the concentricity of the pedestal and the generator. Then put the vertical shaft in the generator rotor's axis hole and attached to the pedestal. The tolerance for assembling the vertical shaft and the pedestal at the bottom of the generator is low to accommodate on-site assembly, resulting in instability occurred in rotation and shortened service life.

Besides, other parts, for example the supporting arms 12 and the vertical shaft 11, are assembled on-site. As shown in FIG. 4, holes are usually drilled in the flange 15 to connect the supporting arms by welding or bolting connection. Such assembly is inconvenient for larger wind turbines, and labor intensity is high.

As described above, parts of vertical axis wind turbines are usually delivered separately to installation site, and assembled and commissioned on-site. Therefore, on-site workload is increased. Limited by the on-site assembly condition, the stability and reliability of wind turbines are greatly undermined, resulting in shortened service life.

If the assembly is undertaken in the manufacturing facility, it is inconvenient to deliver. Further, because of the inherit defects with the above connecting methods, the stability, reliability, and service life of the wind turbines are greatly undermined.

Therefore, a new technology is anticipated to overcome the above problems.

SUMMARY OF THE INVENTION

The object of this invention is to overcome the above drawbacks by simplifying the structure and increasing the stability, reliability, and service life of the vertical axis wind turbines, and by making on-site assembly easy and cutting on-site workload and cost, without undermining their wind resistance capability and safety, to prompt wider application of vertical axis wind turbines.

A vertical axis wind turbine comprising: a vertical axis wind mill 1 having a vertical shaft 11 and blades 13; a generator 2 having a generator rotor shaft 21; a generator upper bearing 41; a generator lower bearing 42; and supporting arms having upper supporting arms and lower supporting arms; wherein the vertical shaft 11 of the wind mill share the same shaft with the generator rotor shaft 21; the upper bearing 41 is of an angular contact ball bearing, a roller bearing or a cylindrical roller bearing; the lower bearing 42 is of an angular contact ball bearing; and the vertical shaft 11 and the generator shaft 21 is hollow inside.

Assume each of the blades of the wind mill is H in length, based on mechanical analysis, the upper supporting arms and lower supporting arms are preferably hold each blade at ¼ H at both ends, and assume the vertical shaft is L in length, the distance between the upper supporting arms and lower supporting arms is h, the L/h ratio is 1/1 to 3/2.

A vertical axis wind turbine comprising: a vertical axis wind mill 1 having a vertical shaft 11 and blades 13; a generator 2 having a generator rotor shaft 21; a generator upper bearing 41; a generator lower bearing 42; and supporting arms having upper supporting arms and lower supporting arms; wherein the vertical shaft 11 is sleeved inside the generator rotor shaft 21, and torque are conveyed by a key 45; the vertical shaft 11 and the generator rotor shaft 21 are rigid connected (tight fit or using structural adhesive) or clearance fit 22 (tolerance <+0.2 mm) at the upper bearing 41 and the lower bearing 42 to assume the wind mill's weight and alternating load; the upper bearing 41 is of an angular contact ball bearing, a roller bearing, or a cylindrical roller bearing; the lower bearing 42 is of an angular contact ball bearing; and the vertical shaft 11 or the generator shaft 21 are hollow inside. The bottom of the vertical shaft 11 features chamfers with an inclination for the purpose of bearing the weight of wind mill and easy assembly.

Assume each of the blades of the wind mill is H in length, based on mechanical analysis, the upper supporting arms and lower supporting arms are preferably hold each blade at ¼ H at both ends, and assume the vertical shaft is L in length, the distance between the upper supporting arms and lower supporting arms is h, the L/h ratio is 1/1 to 3/2.

A preferred bearing arrangement is the lower bearing 42 of the generator shaft 21 adopts an angular contact ball bearing which has an inclination, and fixed on the generator's pedestal to bear the weight of wind mill; the upper bearing 41 may be of an angular contact ball bearing, a roller bearing, or a cylindrical roller bearing. Such a structure leaves out the sleeve 3, the bearings 43 and 44, and the pedestal 6.

The vertical 11 or the rotor shaft 21 is hollow inside to reduce weight.

The base of the vertical shaft 11 features a chamfer 23 with inclination.

A supporting-arms-connecting flange which facilitates on-site assembly comprising: a central hole; and a plurality of joints 14 which are of sleeve structure; wherein the central hole of the flange is to hold the vertical shaft; a plurality of the joints 14 is designed to connect the supporting arms 12; and the joints are of sleeve structure of inserting type or threaded type. The sleeve structure may be of cylindrical, and connected with corresponding supporting arms by way of inserting or thread, greatly reducing the on-site workload.

Pins or bolts are used in the connecting part of the supporting arm and the flange joint for further reinforcement. The supporting arms may be hollow inside.

BRIEF DESCRIPTION OF THE DRAWINGS

Detailed description will be given below in conjunction with accompanying drawings and implementation examples.

REFERENCE CHARACTERS

1—vertical axis wind mill, 2—generator, 11—vertical shaft, 12—supporting arm, 13—blade, 14—joint, 15—flange, 16—pin or bolt, 21—rotor shaft, 22—tight fit, 23—inclination, 3—sleeve, 41—upper bearing, 42—lower bearing, 43—bearing, 44—bearing, 45—key, 5—coupling, 6—pedestal.

DETAILED DESCRIPTION OF THE EMBODIMENTS

The following implementation examples give a further detailed description of this invention, but are not a limitation of this invention.

Example 1

Figure 5:
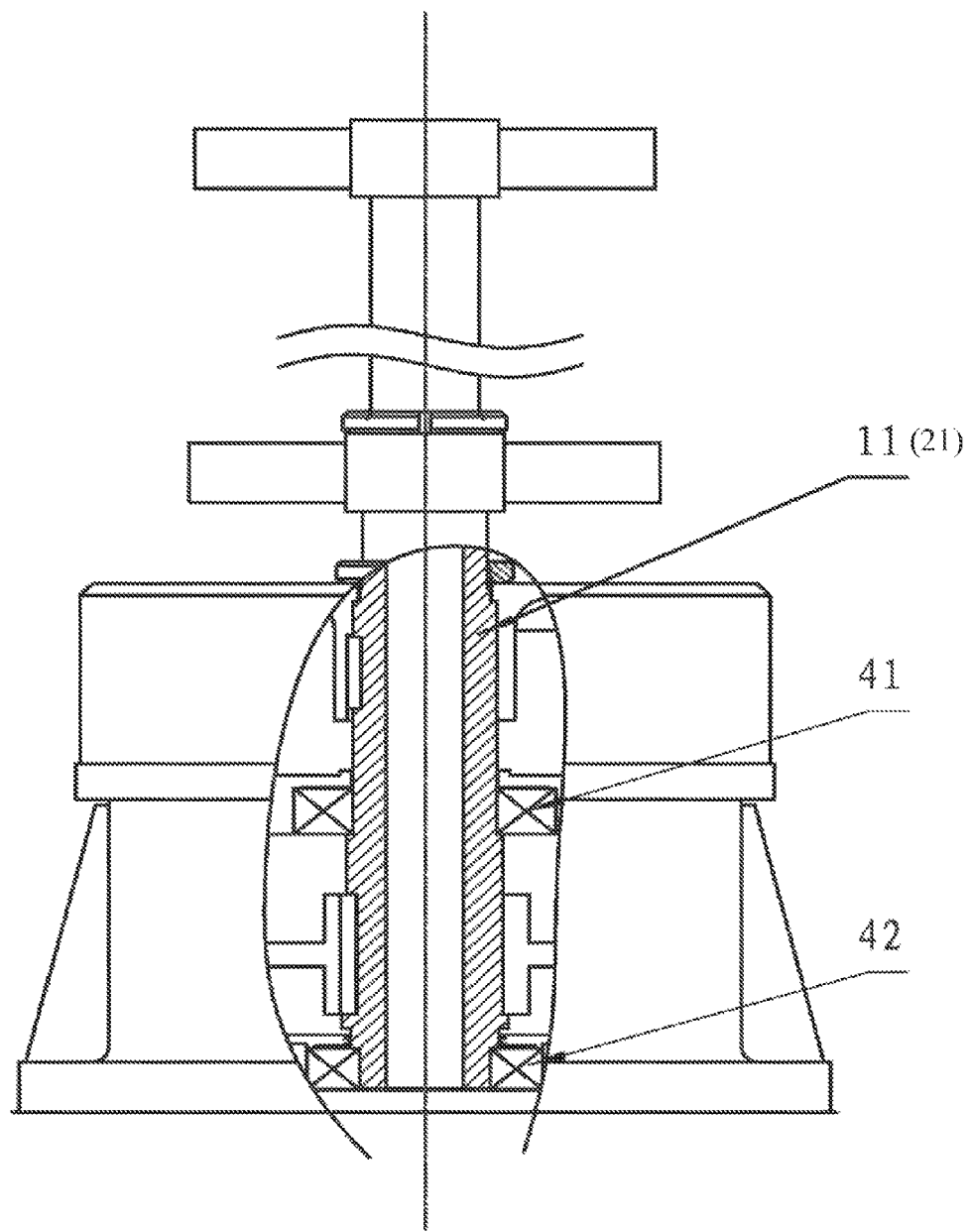
FIG. 5 is a schematic diagram of the structure of this invention.
Figure 9:
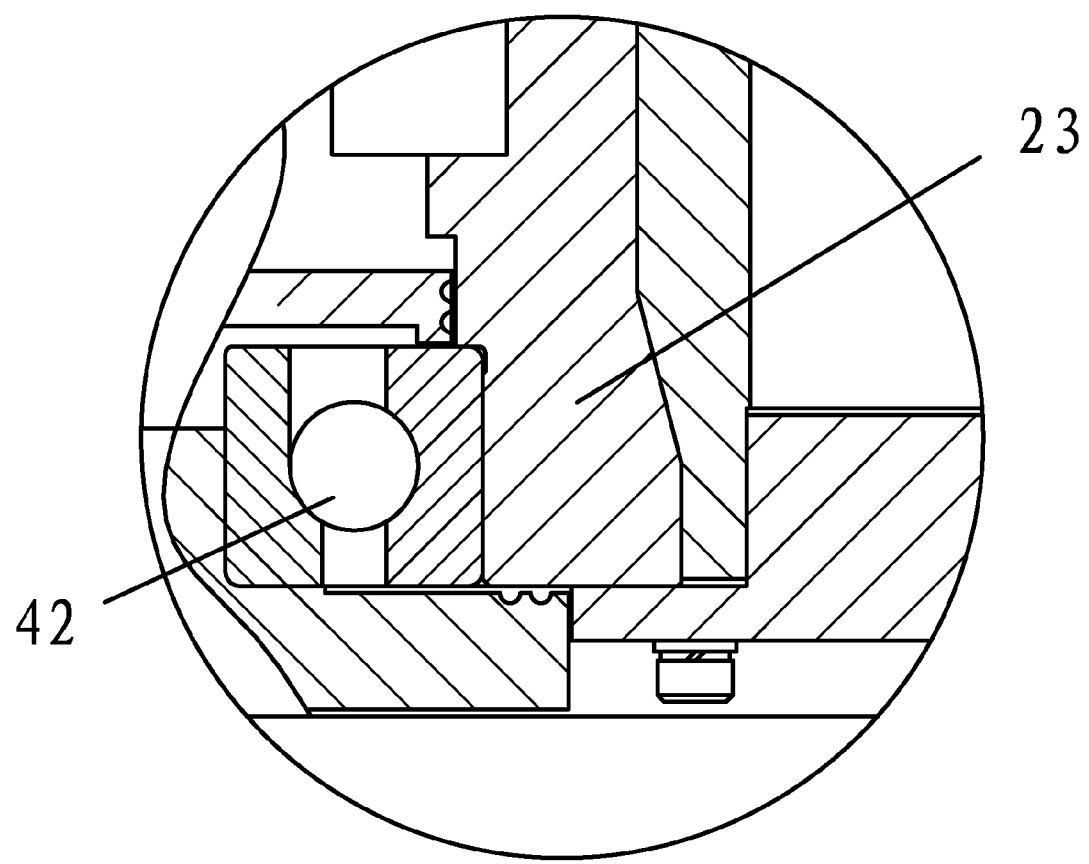
FIG. 9 is a schematic diagram of the structure of the shaft base and the generator's lower bearing.

A vertical axis wind turbine, as shown in FIG. 5, comprises: a vertical axis wind mill and a generator, wherein the vertical shaft 11 of the wind mill share the same shaft with the generator rotor shaft 21. The shaft is hollow inside to reduce weight. There is a chamfer 23 with inclination at the base of the hollow shaft, as shown in FIG. 9, to bear the wind mill's weight and to facilitate assembly. The lower bearing, an angular contact ball bearing with an inclination, is fixed on the pedestal to bear the wind mill's weight.

Figure 6:
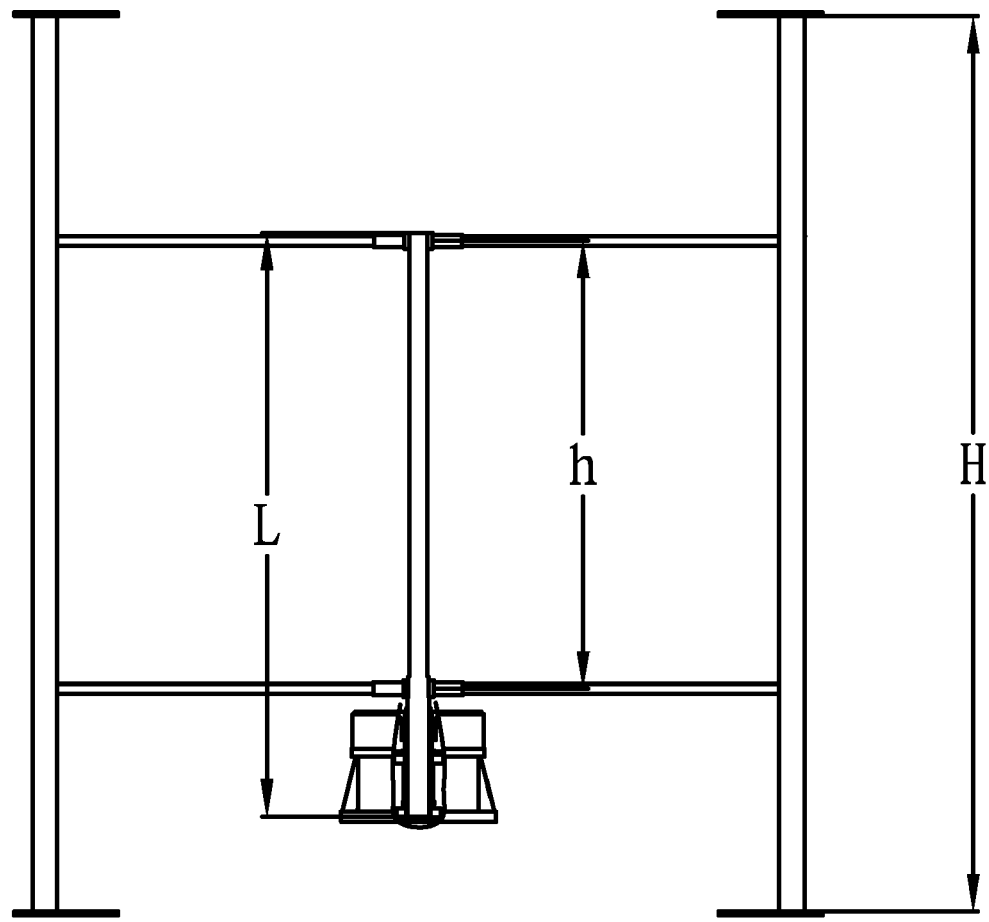
FIG. 6 is a schematic diagram of the dimension of the present wind mill and shaft.

As shown in FIG. 6, assume each of the blades of the wind mill is H in length, based on mechanical analysis, the upper supporting arms and lower supporting arms preferably hold each blade at ¼ H at both ends, and assume the vertical shaft is L in length, the distance between the upper supporting arm and lower supporting arms is h, the L/h ratio is 1/1 to 3/2.

Example 2

Figure 7:
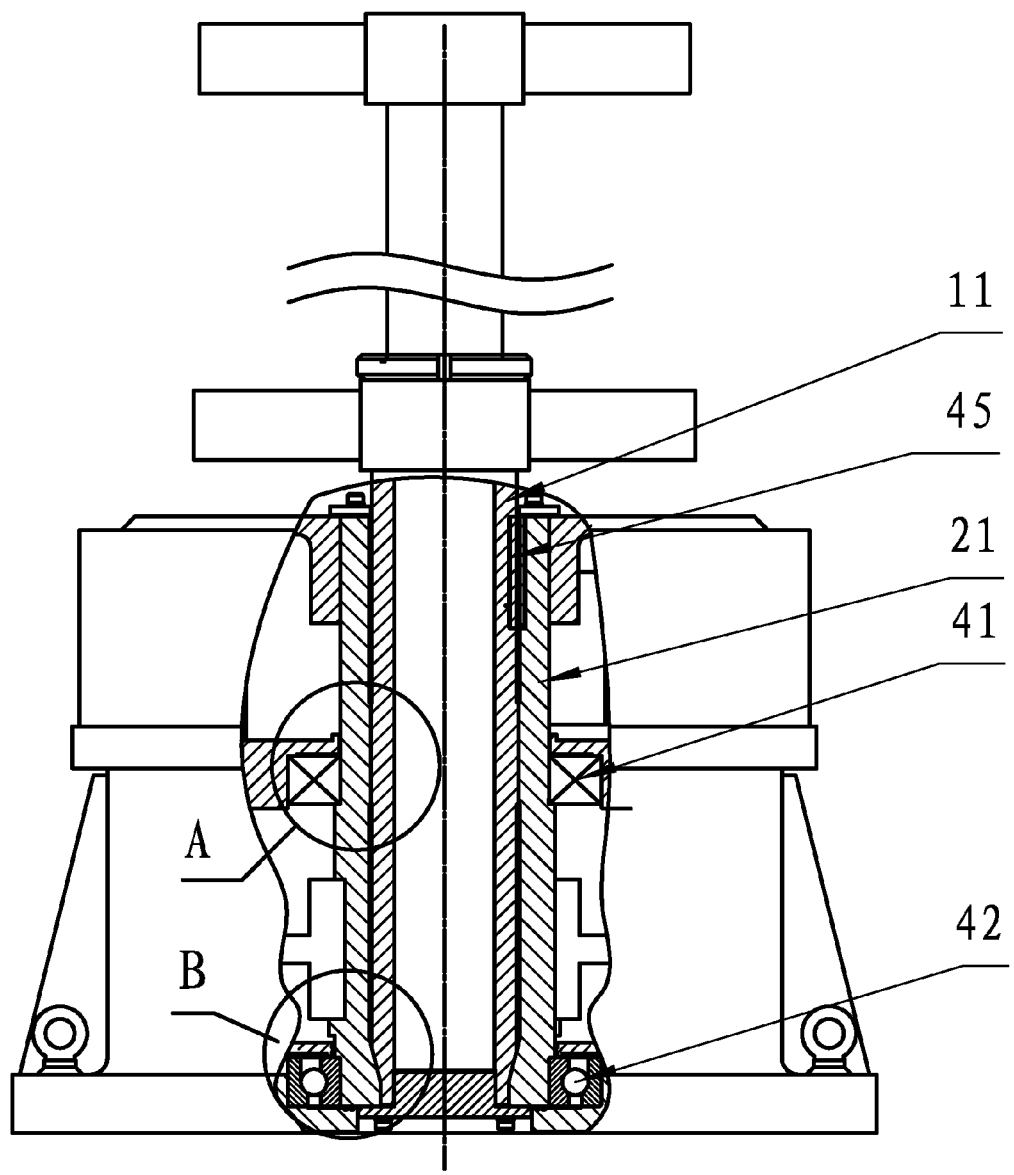
FIG. 7 is a schematic diagram of the structure of the present vertical shaft and generator rotor shaft.
Figure 8:
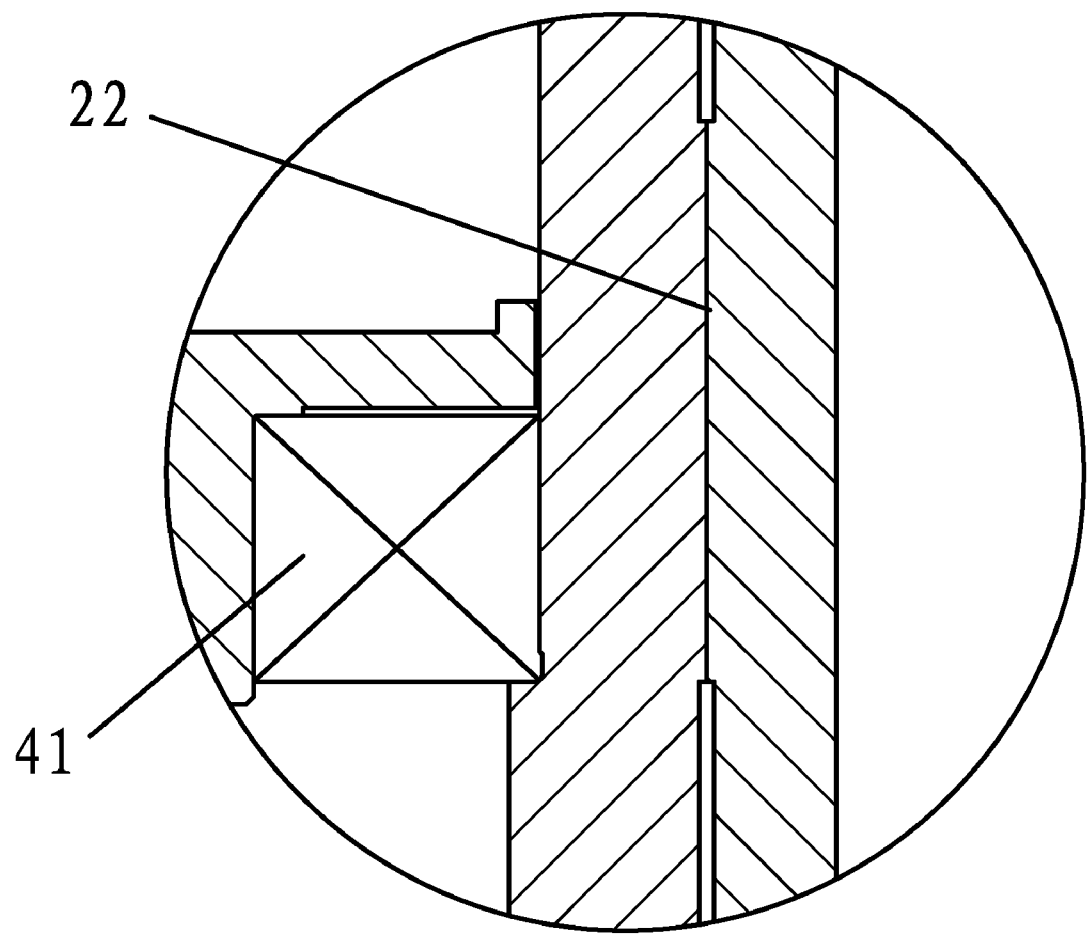
FIG. 8 is a schematic diagram of the bearing structure in the generator of this invention.

As shown in FIG. 7, a vertical axis wind turbine comprising: a vertical axis wind mill 1 and a generator 2, wherein the vertical shaft 11 is sleeved inside of the generator rotor shaft 21, and torque are conveyed by a key 45. At lease one of the upper bearing 41 or lower bearing is of an angular contact ball bearing, a roller bearing or a cylindrical roller bearing. The vertical shaft 11 and the generator rotor shaft 21 are rigid connected (tight fit or using structural adhesive) or clearance fit (tolerance <+0.2 mm) at upper bearing 41 and lower bearing 42 to assume the wind mill's weight and alternating load, as shown in FIG. 8. The bottom of the vertical shaft 11 features chamfers with an inclination, as shown in FIG. 9, for the purpose of bearing the wind mill's weight and easy assembly.

Figure 1:
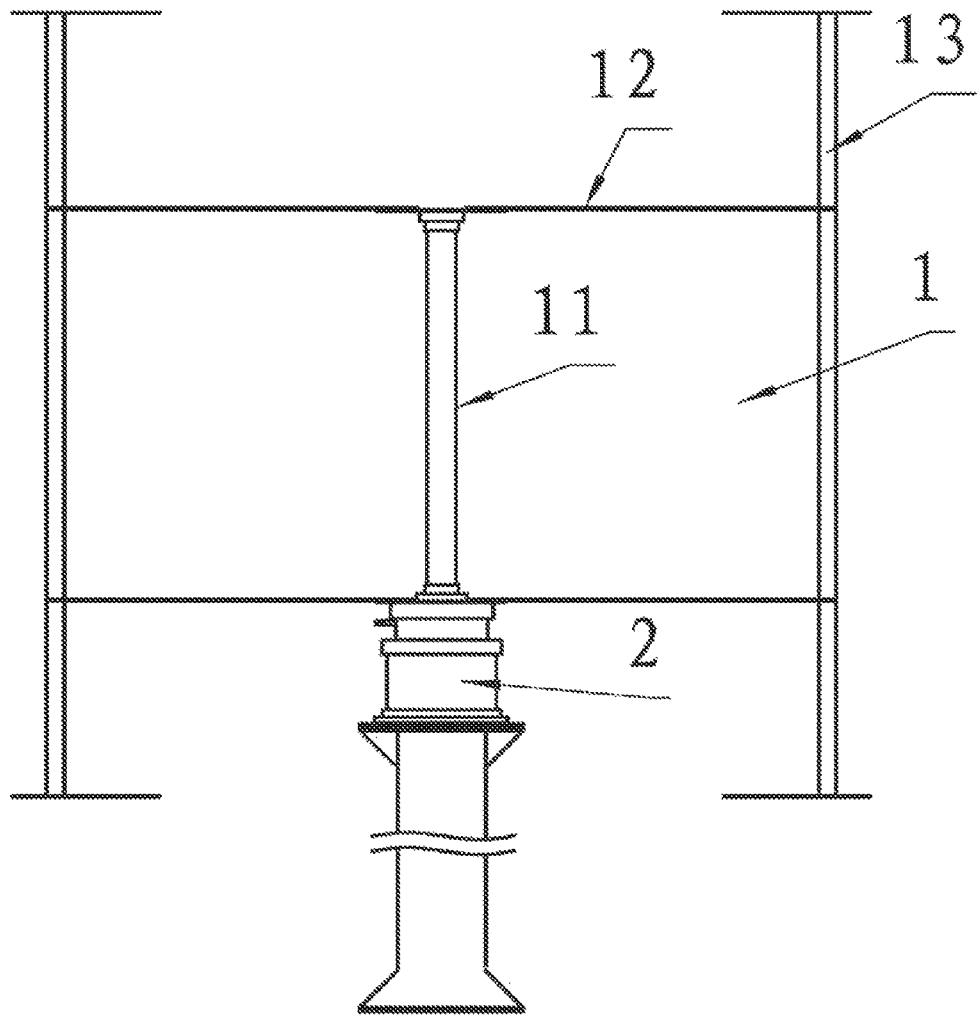
FIG. 1 is a schematic diagram of the currently known vertical axis wind turbine structure.
Figure 2:
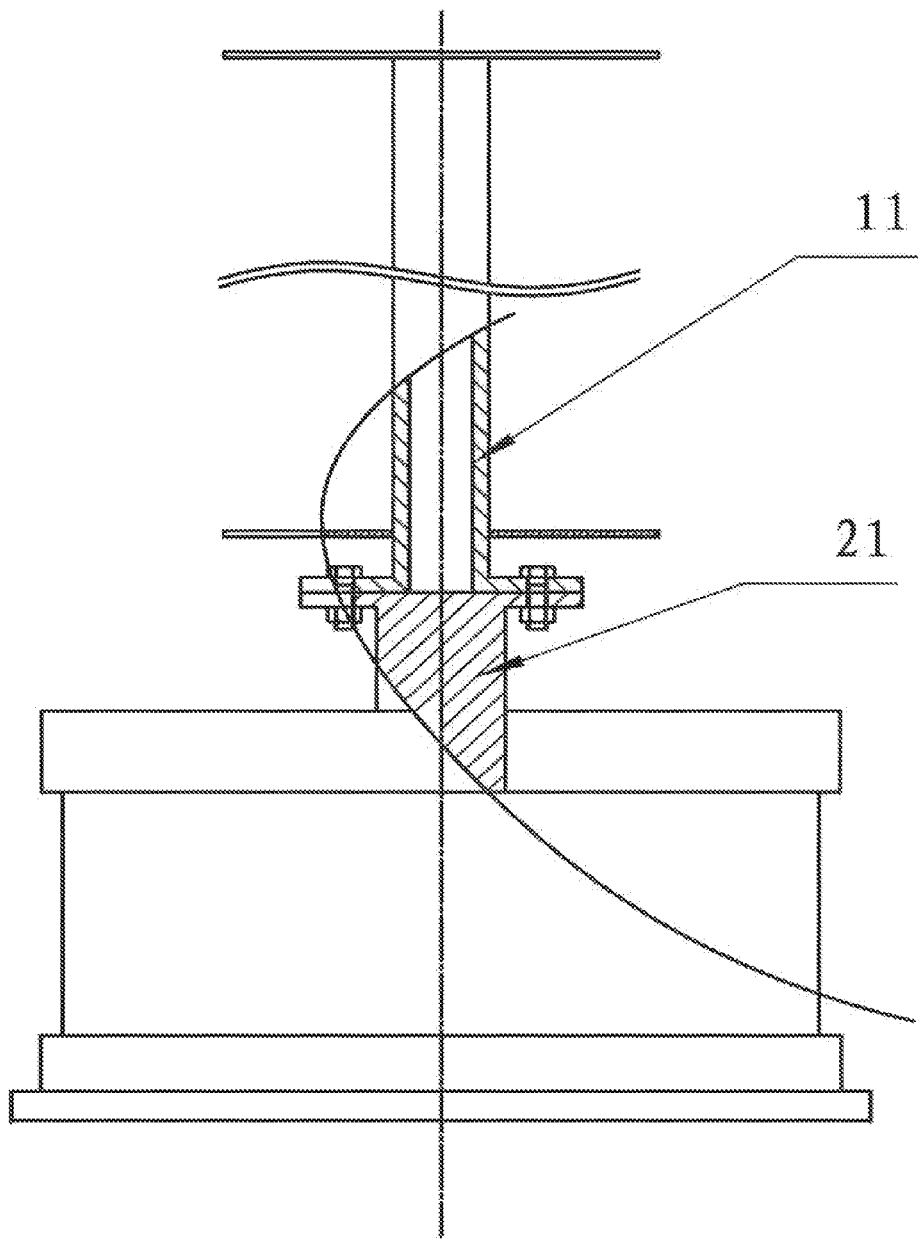
FIG. 2 is a schematic diagram of one type of the current vertical axis wind turbine structure.
Figure 3:
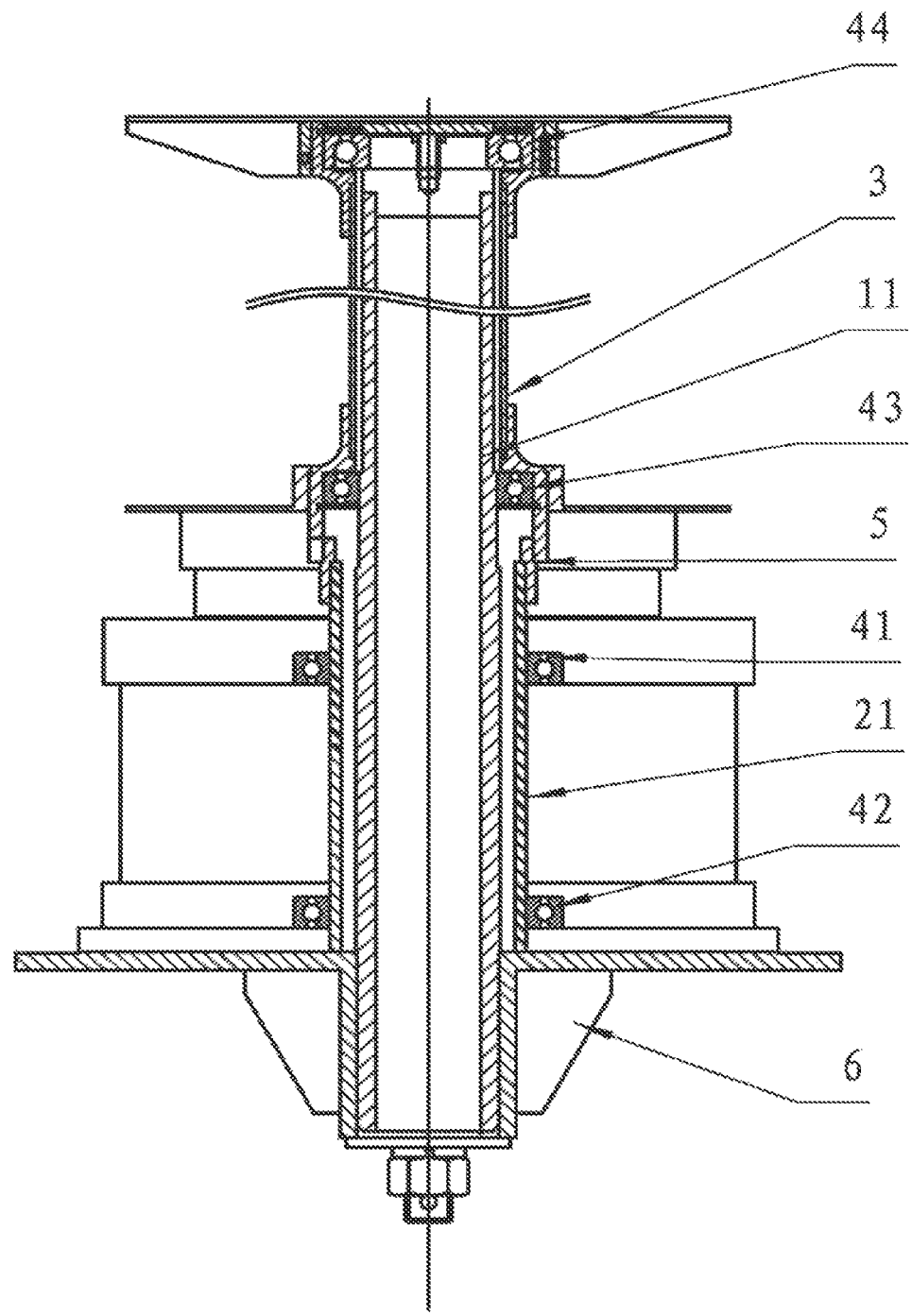
FIG. 3 is a schematic diagram of another type of current vertical axis wind turbine structures.
Figure 4:
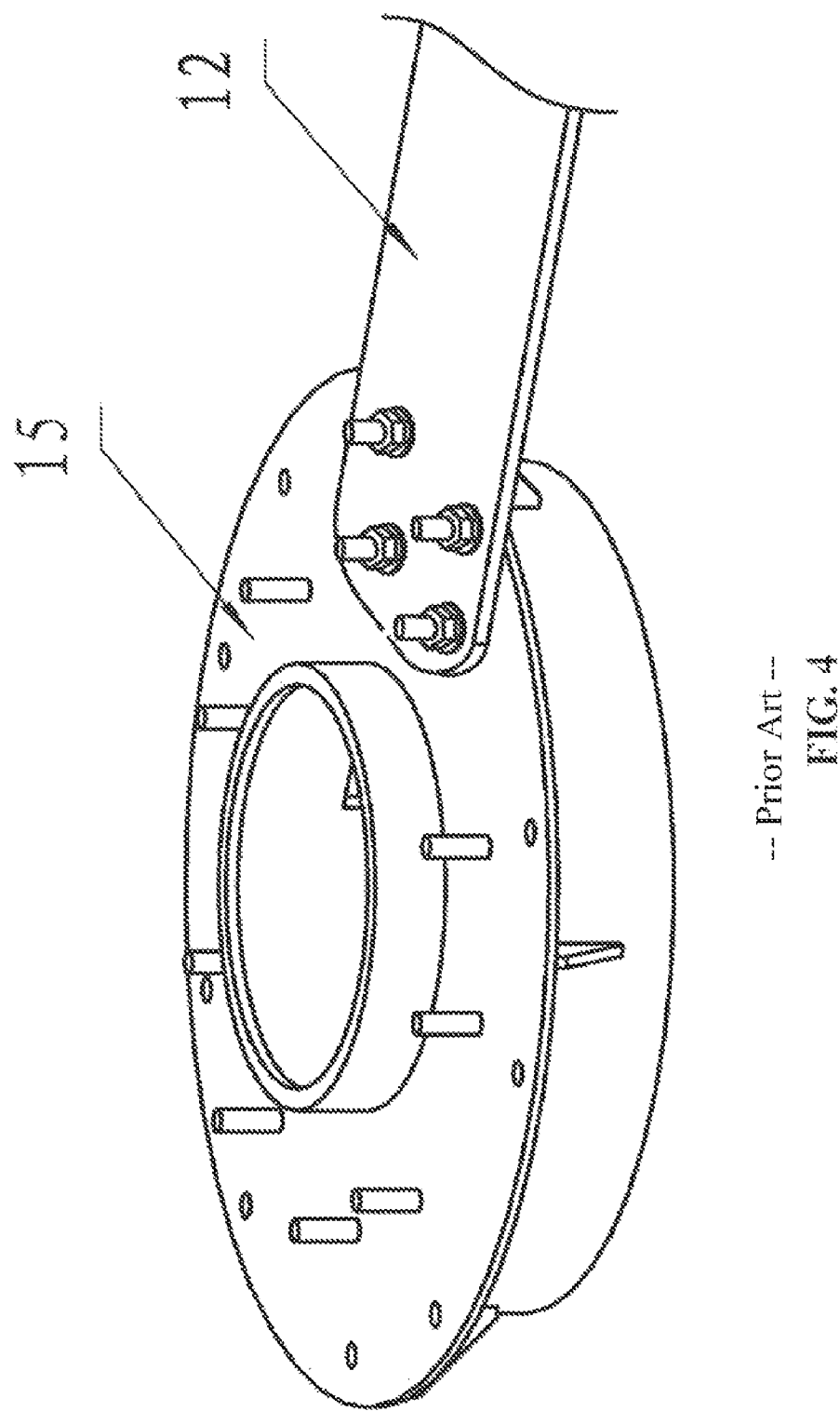
FIG. 4 is a schematic diagram of the current structure of flange and supporting arm.

The lower bearing 42 of the generator shaft adopts an angular contact ball bearing which has an inclination, and fixed on the generator's pedestal to bear the wind mill's weight; the upper bearing 41 may be of an angular contact ball bearing, a roller bearing, or a cylindrical roller bearing. Such a structure leaves out the sleeve 3, bearings 43 and 44, and pedestal 6 that exist in currently known structure as shown in FIG. 3. To reduce weight, the vertical 11 and rotor shaft 21 are hollow inside.

Example 3

Figure 10:
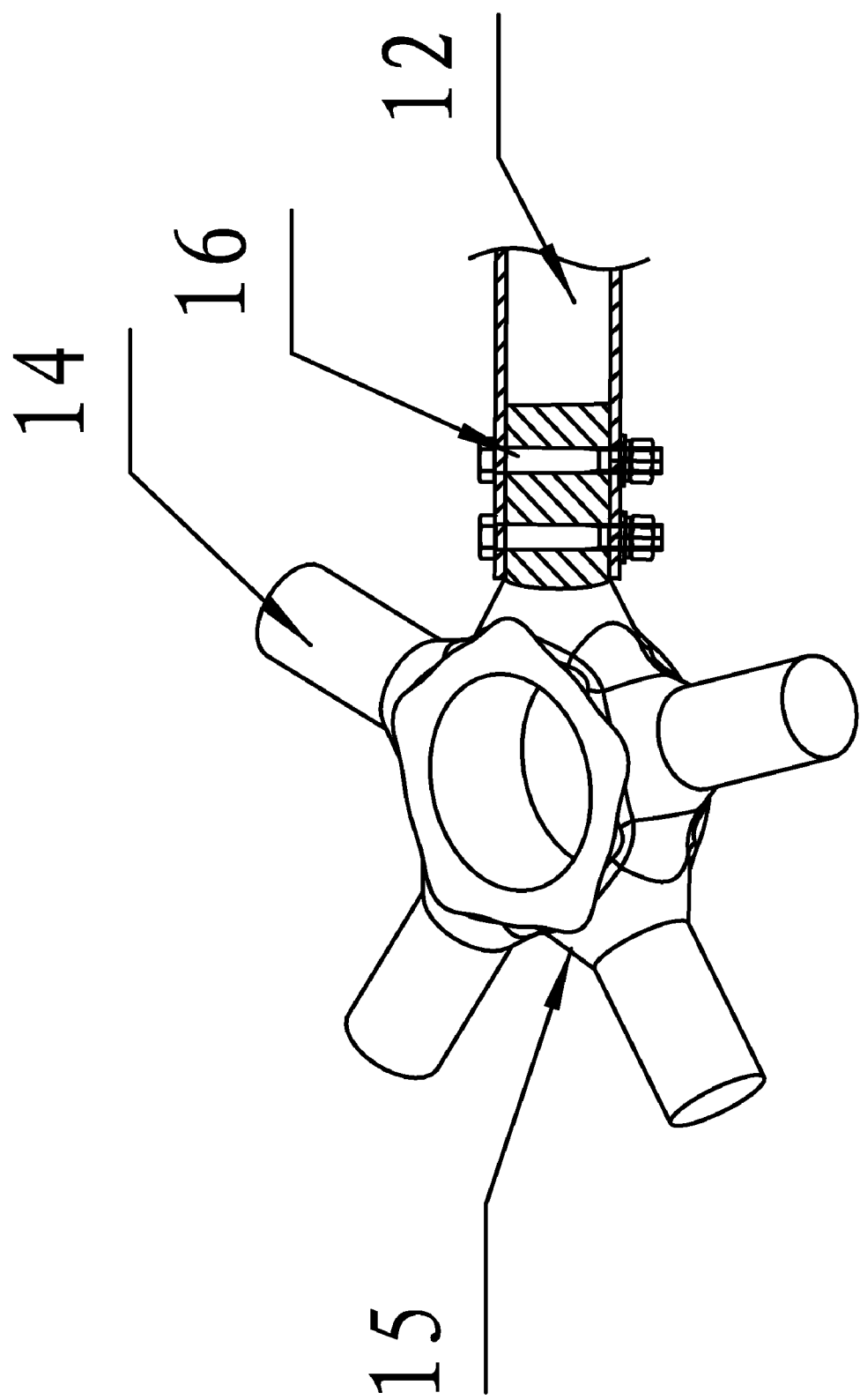
FIG. 10 is a schematic diagram of connection of the flange and the supporting arm in this invention.

A supporting-arms-connecting flange that facilitates on-site assembly as shown in FIG. 10. The flange 15 has a central hole to hold the vertical shaft, and a plurality of joints 14, which are of sleeve structure. The sleeve structure may be cylindrical, and connected with corresponding supporting arms by way of inserting or thread, greatly reducing the on-site workload. Pins or bolts 16 are used in the connecting part of the supporting arm and the flange joint for further reinforcement. The supporting arms may be hollow inside.

This invention simplifies the structure and increases the stability, reliability and services life of the vertical axis wind turbines, and by making on-site assembly easy and cutting on-site workload and cost, without undermining their wind resistance capability and safety, prompts wider application of vertical axis wind turbines.

While particular embodiments of the invention have been shown and described, it will be obvious to those skilled in the art that changes and modifications may be made without departing from the invention in its broader aspects, and therefore, the aim in the appended claims is to cover all such changes and modifications that fall within the true spirit and scope of the invention.

The invention claimed is:

1. A vertical axis wind turbine comprising:
a vertical axis wind mill having a vertical shaft and blades;
a generator disposed on the vertical shaft and having the vertical shaft as its generator rotor shaft;
a generator upper bearing;
a generator lower bearing; and
pairs of supporting arms, each pair for connecting one blade to the vertical shaft and having an upper supporting arm and a lower supporting arm, the corresponding pair of the upper supporting arm and the lower supporting arm are substantially parallel to each other;
wherein
said upper bearing is of an angular contact ball bearing, a roller bearing, or a cylindrical roller bearing;
said lower bearing is an angular contact ball bearing;
said vertical shaft is hollow inside;
said upper supporting arms and lower supporting arms hold said blades at ¼ H at both ends, H being length of each blade of the wind mill; and
a ratio between a length of said vertical shaft L in length, and a distance between said upper supporting arms and corresponding lower supporting arms h, L/H, is 1/1 to 3/2.

2. The vertical axis wind turbine of claim 1, wherein said lower bearing has an inclination.

3. The vertical axis wind turbine of claim 1, wherein bottom portion of said vertical shaft has a chamfer with an inclination.

4. The vertical axis wind turbine of claim 1, further comprising
a flange for connecting the supporting arms to the vertical shaft,
wherein the flange comprises a central hole for holding the vertical shaft and a plurality of joints for connecting the supporting arms, and the joints are insertion-type or threaded-type sleeves.

5. The vertical axis wind turbine of claim 4, wherein the supporting arms are fixed to the flange by pins or bolts.

6. The vertical axis wind turbine of claim 4, wherein said supporting arms are hollow inside.

7. A vertical axis wind turbine comprising:
a vertical axis wind mill having a vertical shaft and blades;
a generator having a generator rotor shaft;
a generator upper bearing;
a generator lower bearing;
pairs of supporting arms, each pair for connecting one blade to the vertical shaft and having an upper supporting arm and a lower supporting arm, the corresponding pair of the upper supporting arm and the lower supporting arm are substantially parallel to each other;
wherein
said vertical shaft is sleeved inside said generator rotor shaft;
said vertical shaft and said generator rotor shaft are rigid connected or clearance fit at said upper bearing and said lower bearing;
said upper bearing is of an angular contact ball bearing, a roller bearing, or a cylindrical roller bearing;
said lower bearing is of an angular contact ball bearing;
said vertical shaft or said generator shaft are hollow inside;
said upper supporting arms and lower supporting arms hold said blades at ¼ H at both ends, H being length of each blade of said wind mill; and
a ratio of a length of said vertical shaft L, to a distance between said upper supporting arms and corresponding lower supporting arms h, the L/H, ratio is 1/1 to 3/2.

8. The vertical axis wind turbine of claim 7, wherein said lower bearing has an inclination.

9. The vertical axis wind turbine of claim 7, wherein bottom portion of said vertical shaft has a chamfer with an inclination.

10. The vertical axis wind turbine of claim 7, further comprising
a flange for connecting the supporting arms to the vertical shaft,
wherein the flange comprises a central hole for holding the vertical shaft and a plurality of joints for connecting the supporting arms, and the joints are insertion-type or threaded-type sleeves.

11. The vertical axis wind turbine of claim 10, wherein the supporting arms are fixed to the flange by pins or bolts.

12. The vertical axis wind turbine of claim 10, wherein said supporting arms are hollow inside.

13. The vertical axis wind turbine of claim 7, wherein said vertical shaft and said generator rotor shaft are rigid connected at said upper bearing and said lower bearing by tight fit.

14. The vertical axis wind turbine of claim 7, wherein said vertical shaft and said generator rotor shaft are rigid connected at said upper bearing and said lower bearing by structural adhesive.

15. The vertical axis wind turbine of claim 7, wherein said vertical shaft and said generator rotor shaft are clearance fit at said upper bearing and said lower bearing by a tolerance of less than +0.2 mm.

* * * * *

UNITED STATES PATENT AND TRADEMARK OFFICE
CERTIFICATE OF CORRECTION

PATENT NO. : 8,390,142 B2
APPLICATION NO. : 13/164750
DATED : March 5, 2013
INVENTOR(S) : Qiang Yan et al.

It is certified that error appears in the above-identified patent and that said Letters Patent is hereby corrected as shown below:

In the Claims

Column 5, line 23, in claim 1, "L/H" should be changed to -- L/h --.

Column 6, line 18, in claim 7, "L/H" should be changed to -- L/h --.

Signed and Sealed this
Thirtieth Day of April, 2013

Teresa Stanek Rea
*Acting Director of the United States Patent and Trademark Office*